(12) United States Patent
Ejiri et al.

(10) Patent No.: US 9,261,661 B2
(45) Date of Patent: Feb. 16, 2016

(54) STRUCTURES OF CONNECTING OPTICAL WAVEGUIDE PARTS AND HOLDING PARTS OF HOLDING OPTICAL INPUT MEMBERS, AND A METHOD OF PRODUCING THE SAME

(71) Applicant: NGK INSULATORS, LTD., Aichi-prefecture (JP)

(72) Inventors: Tetsuya Ejiri, Kasugai (JP); Jungo Kondo, Miyoshi (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 0 days.

(21) Appl. No.: 14/224,193

(22) Filed: Mar. 25, 2014

(65) Prior Publication Data
US 2014/0286607 A1 Sep. 25, 2014

(30) Foreign Application Priority Data
Mar. 25, 2013 (JP) .................................. 2013-062107

(51) Int. Cl.
G02B 6/42 (2006.01)

(52) U.S. Cl.
CPC ............ *G02B 6/4239* (2013.01); *G02B 6/4202* (2013.01); *G02B 6/423* (2013.01); *Y10T 156/10* (2015.01)

(58) Field of Classification Search
CPC ............................ G02B 6/4239; G02B 6/4202
See application file for complete search history.

(56) References Cited

FOREIGN PATENT DOCUMENTS

JP 2010-185980 A 8/2010

*Primary Examiner* — Jerry Rahll
(74) *Attorney, Agent, or Firm* — Cermak Nakajima & McGowan LLP; Tomoko Nakajima

(57) ABSTRACT

A connecting structure includes an optical waveguide part, a holding part of holding an optical input member, and an adhering part adhering the optical waveguide part and holding part. The optical waveguide part includes an optical waveguide substrate including an optical waveguide. At least one of the holding part and optical waveguide part includes a recess and an adhesive face adjacent to the recess. The adhering part is provided on the adhesive face and in a single region distant from the optical waveguide substrate in a direction of thickness of the optical waveguide substrate. The recess is provided between the adhering part and optical waveguide substrate. A space is provided between an end face of the optical input member and an end face of the optical waveguide.

11 Claims, 13 Drawing Sheets

STRUCTURES OF CONNECTING OPTICAL WAVEGUIDE PARTS AND HOLDING PARTS OF HOLDING OPTICAL INPUT MEMBERS, AND A METHOD OF PRODUCING THE SAME

This application claims the benefit of Japanese Patent Application P2013-062107, filed on Mar. 25, 2013, the entirety of which is incorporated by reference.

BACKGROUND OF THE INVENTION

1. Field of the Invention

The present invention relates to a structure of connecting an optical waveguide part and a holding part of holding an optical input member such as an optical fiber, in which deviation of an insertion loss and an light amount is low with respect to cycles of thermal shock.

2. Related Art Statement

In the case that laser light is transmitted using an optical fiber and connected to an optical waveguide, a holding part of holding the optical fiber is usually connected to an optical waveguide part through an optical adhesive.

In the case that the optical adhesive is applied between end faces of the optical fiber and optical waveguide to form an adhesive layer, however, the adhesive layer is present in the optical path. Then, in the case that laser of a high output power is used as a light source, the generated heat may possibly deteriorate the adhesive.

Therefore, as a method for preventing the deterioration of the adhesive, it was proposed Patent document 1 (Japanese Patent Publication No. 2010-185,980A). According to the method, for example as shown in FIGS. 7 and 8, recesses 30 are formed in two regions of an optical waveguide substrate 18, and protrusions 31 are formed at both of right and left ends of the optical waveguide substrate 18 viewed from the optical waveguide by the recesses 30. Then, an end face 31a of each protrusion 31 is made an adhesive face, and they are adhered onto a substrate 2 of holding an optical fiber through an optical adhesive 12. At this time, the optical adhesive is not provided between the optical fiber and optical waveguide. The optical adhesive is thereby out of the optical path so that it is possible to prevent the deterioration of the adhesive.

Patent document 1: Japanese Patent Publication No. 2010-185,980A

SUMMARY OF THE INVENTION

The inventors have produced and further investigated the structure of adhering an optical waveguide part and a part of holding an optical input member through an optical adhesive according to the descriptions of the Patent document 1. As a result, after many times of cycles of thermal shock were applied thereon, it may be observed the phenomenon that the optical insertion loss and propagating light amount became unstable and were deteriorated. It should have been prevented, the deterioration by the light propagating in a gap of the optical fiber and optical waveguide, and it is not considered the influence of the deterioration of the adhesive. Further, since the adhesive is present at the two symmetric regions of substrate as shown in FIG. 7, and a stress due to the thermal shock should have been symmetrically applied on the right and left regions, the above results could not be predicted.

Further, after the optical waveguide substrate and a part of holding an optical input member are adhered to each other, the light intensity of light propagating in the optical waveguide may be deteriorated due to unknown reasons.

An object of the present invention is to provide a structure which adheres an optical waveguide part and a holding part of holding an optical input member with an adhesive without intervening the adhesive in its optical path and to reduce unstableness and reduction of an insertion loss or light amount of propagating light after thermal cycles are applied.

The present invention provides a connecting structure comprising an optical waveguide part, a holding part of holding an optical input member and an adhering part adhering the optical waveguide part and the holding part;
  wherein the optical waveguide part comprises an optical waveguide substrate comprising an optical waveguide,
  wherein at least one of the holding part and optical waveguide part comprises a recess and an adhesive face adjacent to the recess;
  wherein an adhering part is provided on said adhesive face and in a single region distant from said optical waveguide substrate in a direction of thickness of said optical waveguide substrate;
  wherein the recess is provided between the adhering part and the optical waveguide substrate; and
  wherein a space is provided between an end face of the optical input member and an end face of the optical waveguide.

The present invention further provides the connecting structure; said method comprising the steps of:
  providing an adhesive on the adhesive face provided on at least one of the holding part and optical waveguide part, while positioning the optical waveguide substrate under the adhesive; and
  curing the adhesive to form the adhering part.

The present inventors have studied the cause of the insertion loss or reduction of the light amount of the propagating light after applying thermal cycles, in the connecting structure as shown in, for example, FIGS. 7 and 8.

Here, the present inventors have investigated the process of alignment of the optical fiber and optical waveguide. In the connection of them, the optical fiber and optical waveguide are aligned first at a submicron order so that the positions of the optical beams are not shifted. It is thus necessary to position the optical waveguide part and holding part three-dimensionally. Then, after the alignment is finished, adhesive is applied on each of adhesive faces 31a of the two protrusions 31 provided at right and left sides of the substrate and then cured to form adhesive layers 12 composed of a cured matter of the adhesive.

However, the adhesive applied on the adhesive face is made of slurry which has fluidity. Therefore, it is difficult to make an amount of the applied adhesive on the adhesive face accurately at a constant value, so that deviation should be present in the amounts of the applied adhesive. Further, deviation is present in the shape and density of the applied adhesive. It is thus considered that the adhesive layers after the curing in the right and left sides are not equivalent and the densities, weights and shapes are different from each other. It is thus considered that the influence of the applied thermal shock on the adhesive layers in the right and left sides would be different from each other, and that many times of the thermal shocks applied on the adhesive layers would cause a small deviation of the alignment to leave impact on the insertion loss or light amount of propagating light.

Based on the hypothesis described above, the present inventors reached the idea of removing the adhesive layer from the optical path between the optical input member and optical waveguide and, at the same time, of providing the adhesive layer in a single region. However, in the case that the adhesive layer is provided in the single region at either of the right and left sides of the substrate, the deviation after the application of the thermal shock would be further increased. Then, it had been reached the idea of forming the adhesive face in a single region in the vertical direction (direction of thickness) of the optical waveguide substrate and of performing the adhesion at the single adhesive face. Then, as a result of actual fabrication and evaluation, it was found that the insertion loss and reduction of light amount of propagating light after the application of the cycles of thermal shock can be prevented. The present invention was thus made.

Further, in producing the connecting structure described above, the optical waveguide substrate is positioned under the adhesive provided the adhesive face and the adhesive is cured at this state to form the adhesive part. It is thus found that the deterioration of the intensity of light propagating in the optical waveguide can be prevented, after the connecting structure is fabricated.

As can be seen from the results, it may be speculated that vapor generated from the adhesive during the curing of the adhesive is applied on the end face of the optical waveguide to result in the deterioration of the light intensity. Then, it is possible to prevent the influence of the application of the adhesive vapor on the end face of the optical waveguide, by positioning the optical waveguide under the adhesive face during the curing of the adhesive.

EMBODIMENTS OF THE INVENTION

The inventive connecting structure includes an optical waveguide part, a holding part of holding an optical input member, and a cured layer of an adhesive of adhering the optical waveguide part and the holding part. The present invention will be described in detail, referring to the attached drawings.

Figure 1:
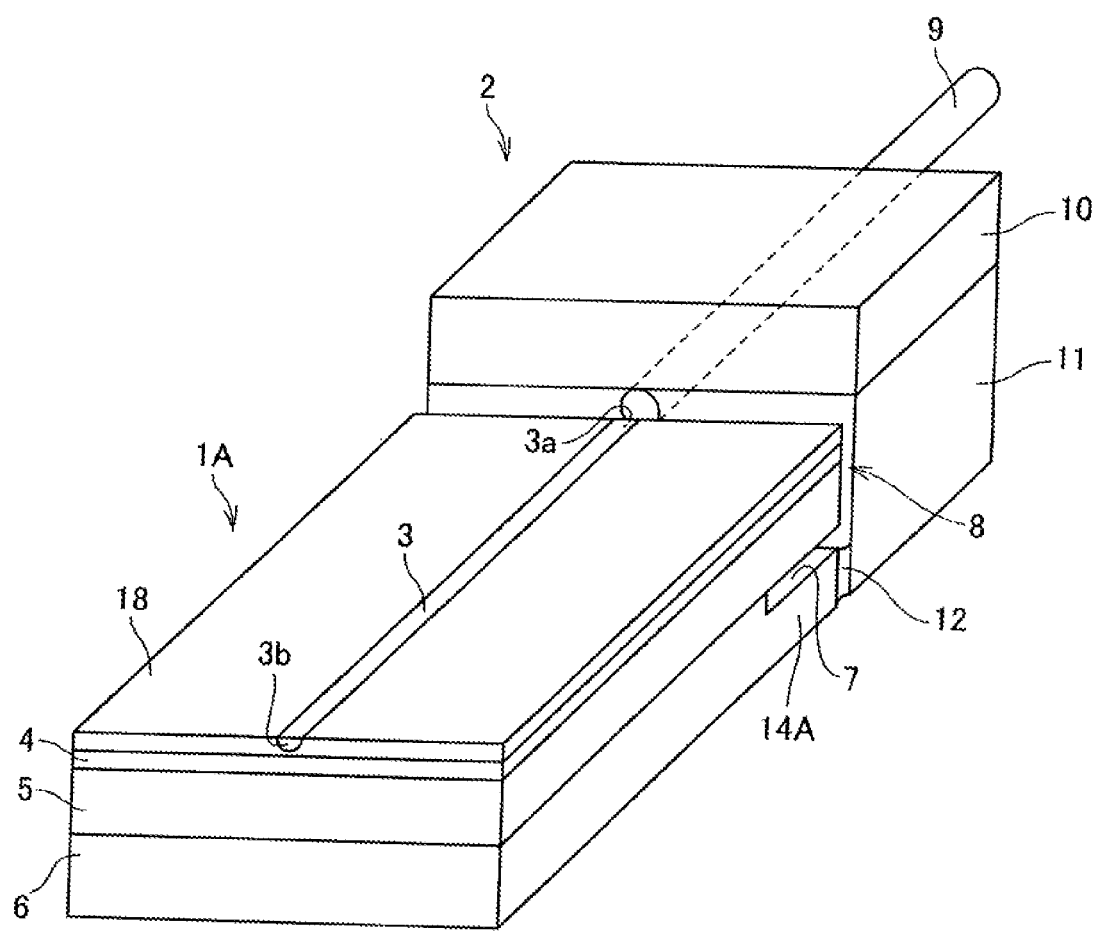
FIG. 1 is a perspective view schematically showing a connecting structure of an optical waveguide part and a holding part 2 of holding an optical transmitting member.

As shown in FIG. 1, an optical waveguide part 1A is joined with a holding part 2 with a cured layer 12 of an adhesive. According to the present example, the optical waveguide part 1A includes an optical waveguide substrate 18, a supporting body 5 adhering the optical waveguide substrate 18 through an adhesive layer 4, and a joining body 6 joined with a bottom of the supporting body 5. A channel type optical waveguide 3 is formed in the optical waveguide substrate 18. A first end face 3b of the channel type optical waveguide 3 is exposed to the end and a second end face 3a is exposed to a face opposing the holding part 2.

Further, an optical input member 9 is fixed on and positioned at a predetermined position of the holding part 2. The holding part 2 is composed of a main body 11 and a cover 10 on the main body 11. The main body 11 includes a predetermined mechanism of holding the optical input member 9.

A space 8 is provided between the end face of the optical waveguide part 1A and the end face of the holding part 2. Then, according to the example shown in FIG. 2, in the optical waveguide part 1, a protrusion 14A, including an adhesive face 14a for adhering a cured layer 12 of an adhesive, is provided in a single region distant from the optical waveguide substrate 18 in the direction "T" of thickness of the optical waveguide substrate 18. Further, a recess 7 is formed between the adhesive face and optical waveguide substrate for defining the adhesive face.

Figure 2:
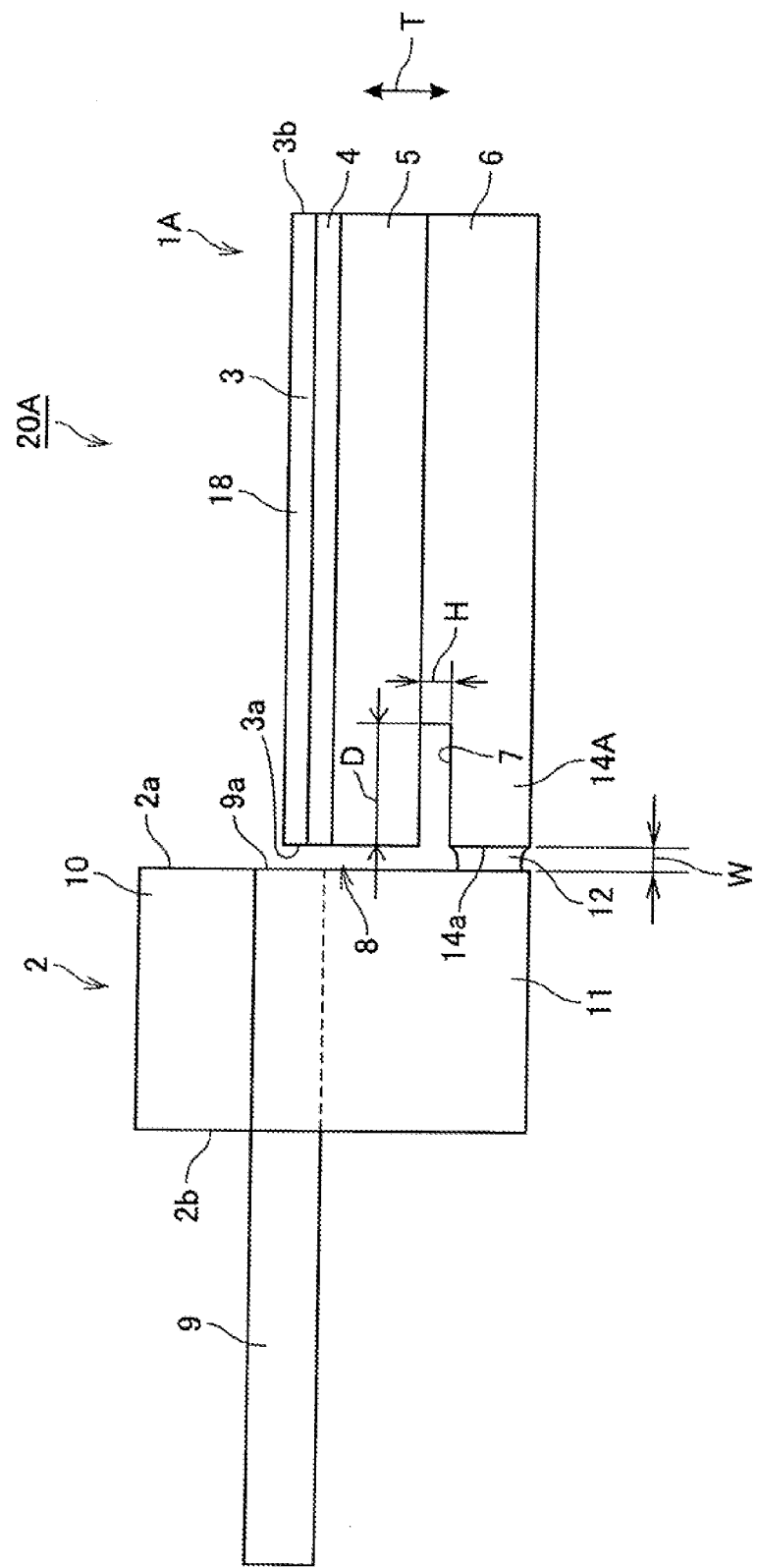
FIG. 2 is a view schematically showing a connecting structure 20A according to an embodiment of the present invention.

For example, as a connecting structure 20A shown in FIG. 2, the cured layer 12 of adhesive is formed between the adhesive face 14a of the protrusion 14A and the end face of the main body 11 of the holding part 2 for adhering them. In this case, a space is provided between the end face 9a of the optical input member 9 and the end face 3a of the optical waveguide 3 without providing an adhesive in the space.

In fabricating the connecting structure, the adhesive is applied onto the adhesive face 14a, the optical waveguide part and holding part are opposed to each other, and the optical input member and optical waveguide are aligned to each other. Then, the adhesive is contacted to the end face of the holding part and then cured. At this time, an excessive amount of the adhesive is flown into the groove 7 so that the thickness of the adhesive is regulated.

According to the present invention, the optical input member means a member for irradiating a predetermined light to the optical waveguide of the optical waveguide part. Such optical input member includes an optical transmitting member such as an optical fiber, an optical ferule and an optical waveguide. In this case, light is made incident into the optical transmitting member from a predetermined light source and then made incident from the optical transmitting member to the optical waveguide part. Further, the optical input member may be a light source such as a semiconductor laser, a light emitting diode or a super luminescence diode (SLD).

The optical fiber includes a GI fiber, a single mode fiber, a polarization maintaining fiber, a rectangular core fiber, a photonic crystal fiber including a clad with holes regularly formed therein, and a fiber with a les fused onto the fiber end.

The holding part is not particularly limited, as far as it can hold and align the optical input member. For example, it may be a holding part holding a single optical fiber in its V-groove, as well as a fiber array including a substrate having a plurality of V-grooves for arranging, containing and fixing a plurality of optical fibers therein with an adhesive, respectively. Further, it may be a lens array including a fiber array with lenses arranged at the forward end of the fiber array. In this case, since an adhesive is not filled in its optical path, it is possible to provide a module using the fiber array with the fused lenses or a lens array.

In the case that the optical input member is a light source such as a semiconductor laser, a light emitting diode or a super luminescent diode (SLD), so called F mount, C mount, CAN type or the like may be listed as a mount for mounting such light source.

The optical waveguide part includes an optical waveguide substrate.

The optical waveguide may be a ridge type optical waveguide directly formed on a main face of the substrate, or a ridge type optical waveguide formed on a main face of the substrate through another layer, or an optical waveguide formed inside of the substrate by inner diffusion or ion exchange method, such as a titanium-diffusion or proton exchange type optical waveguide. Specifically, the optical waveguide may be a ridge type optical waveguide protruding from a surface of the substrate. The ridge type optical waveguide may be formed by laser processing or mechanical processing. Alternatively, a film of a high refractive index is formed on a substrate, and the film of a high refractive index can be then subjected to mechanical processing or laser ablation processing to form a three-dimensional optical waveguide of ridge type. The film of a high refractive index can be formed, for example, by chemical vapor deposition, physical vapor deposition, organic metal chemical vapor deposition, sputtering or liquid phase epitaxy process.

The optical waveguide substrate may be a passive device or an active device. Such active device includes an optical modulation device or a wavelength converting device such as a device for oscillating high harmonic wave.

The optical modulation device may be an intensity modulation device, s phase modulation device, an SSB modulator or a CSRZ modulator.

According to the present invention, it is formed a protruding part including an adhesive face for adhering a cured layer of an adhesive, on one of a holding part and an optical waveguide part. The adhesive face is provided in a single region distant from the optical waveguide substrate in the direction of thickness of the optical waveguide substrate. For example, according to the embodiment shown in FIG. 2, an adhesive face 4a is provided in a single region distant from the optical waveguide substrate 3 in the direction T of thickness of the substrate, and an integrated adhesive layer 12 is formed thereon.

Here, the direction T of thickness of the optical waveguide substrate means a direction perpendicular to the main face of the optical waveguide substrate. Further, when viewed in the direction of thickness, a recess 7 is present between the optical waveguide substrate and adhesive face to prevent the flow of excessive adhesive into the optical path by the recess 7.

If the adhesive faces are provided in the two regions, respectively, there is deviation in the shape, density and properties in the cured layers of the adhesive after the curing, so that insertion loss and light amount of the propagating light become unstable after applying cycles of thermal shock.

According to the present invention, the adhering part (and the adhesive face on which the adhering part is provided) is provided in a single region, and the size of the adhering part is to be adjusted depending on the sizes of the optical waveguide part and holding part to be adhered, and is not particularly limited.

Although the area of the adhering part (and the adhesive face to which the adhering part is provided) is not particularly limited, the area may preferably be 20 to 75, provided that 100 is assigned to the total area of the end face of the optical waveguide part. Further, the distance between the adhering part and optical waveguide substrate viewed in the direction T of thickness may preferably be 40 μm or larger.

Further, according to the present invention, the adhering part is provided in a single region. The adhering part may be composed of an integral cured layer of the adhesive. Alternatively, the adhesive part may be divided into a plurality of the cured layers of the adhesive. In the latter case, the adhering part is divided into a plurality of cured layers of adhesive so that the adjacent cured layers of adhesive may be separated from each other. In this case, the difference of the shape, property and density of the respective cured layers are very small and the distances are also very small, so that the influences of the thermal cycles applied as described above are insignificant. According to the viewpoint of the present invention, it is particularly preferred that the adhering part is composed of the integral cured layer of the adhesive.

According to the present invention, a space is provided between the end face of the optical input member and optical waveguide. For example, according to the example shown in FIG. 2, a space 8 is provided between the end face 9a of the optical input member 9 and the end face 3a of the optical waveguide. In this case, HR (high refractive coating), HT (high transmitting coating) or AR (attenuated reflection coating) may be provided on each of the end faces depending on applications.

Further, each of the adhesive faces of the holding part and the optical waveguide part may or may not be mirror polished.

Further, according to a preferred embodiment, the optical waveguide part includes a supporting body supporting the optical waveguide substrate. For example, according to the example shown in FIG. 2, the optical waveguide substrate 1A includes a supporting body 5 supporting the optical waveguide substrate 3. According to the present example, both are adhered to each other through the adhesive layer 4.

Further, according to a preferred embodiment, the protruding part is provided in the supporting body. It is thus possible to increase the thickness of the supporting body without the function as an optical waveguide, so that the interferences on the functions as an optical waveguide can be prevented and, at the same time, the width of the adhesive face can be sufficiently increased to obtain a high adhesive strength. On the viewpoint, the thickness of the supporting body may preferably be 400 μm or larger and more preferably be 800 μm or larger.

Further, according to a preferred embodiment, the optical waveguide part includes a separate body for adhesion joined with the supporting body, and the protruding part is provided in the body for adhesion. For example, according to the example shown in FIG. 2, a separate body 6 for adhesion is joined to the bottom face of the supporting body 5, and the recess is formed by the body for adhesion and supporting body. A protruding part 14A is formed in the body 6 for adhesion.

Figure 4:
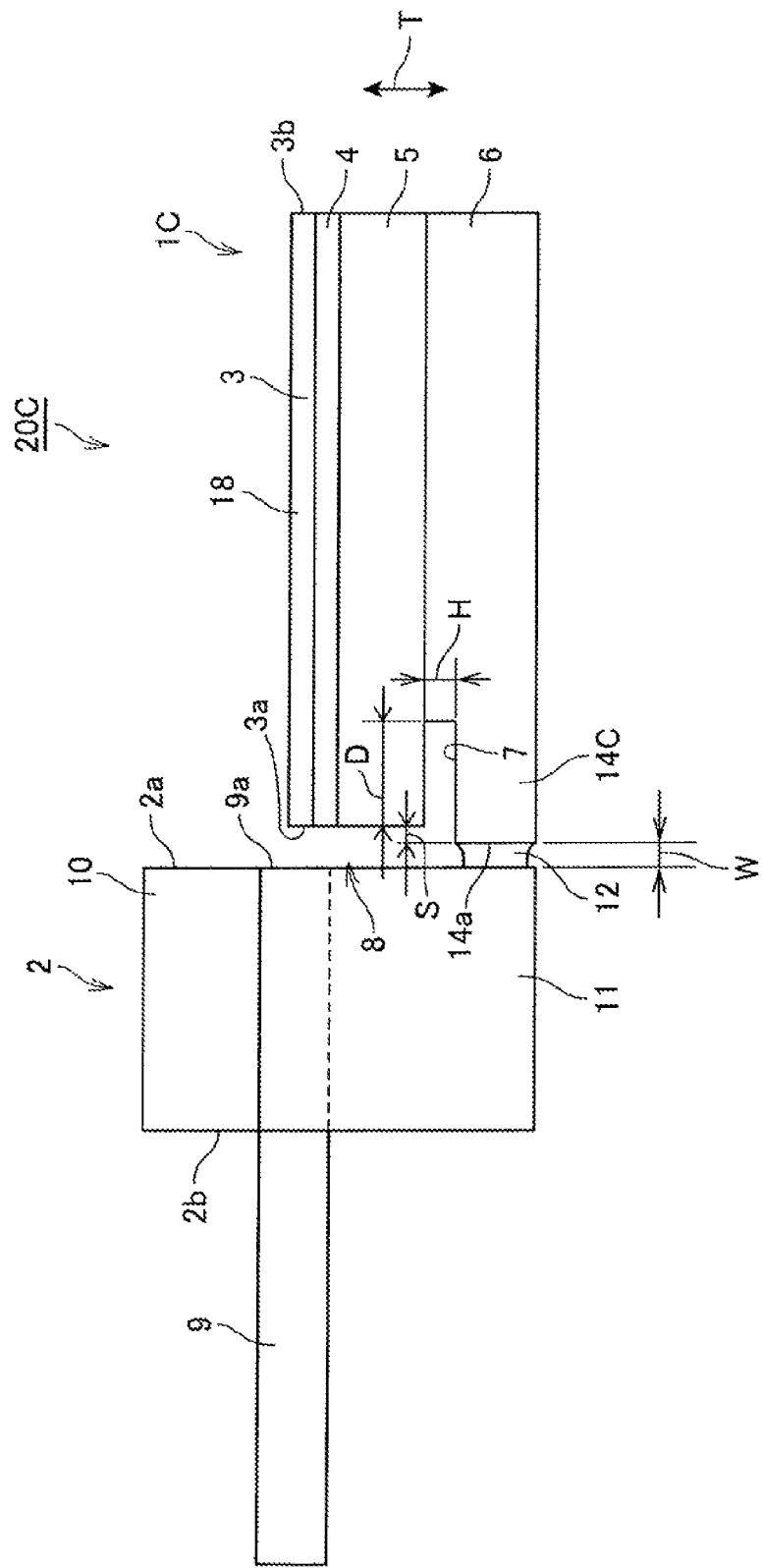
FIG. 4 is a view schematically showing a connecting structure 20C according to still another embodiment of the present invention.

By applying such body for adhesion, the distance from the end face of the optical waveguide substrate can be optionally changed by adjusting the protruding amount S of the protruding part 14C of the body for adhesion shown in FIG. 4. It is thereby possible to adjust the position in the direction of optical axis of the fiber or lens depending on the NFP size of the optical waveguide. Further, in the case that it is used a thin waveguide substrate in which the groove cannot be formed, the body for adhesion having a shape of L character may be joined to it to provide a resin-free structure. Further, in the case that the supporting body is produced from a wafer having a thickness of 1.0 mm or smaller which is readily available, the separate body for adhesion may be joined thereto to make the whole thickness of the part to 2 to 3 mm, so that the adhesion strength can be improved.

Further, it is not required that the supporting body and body for adhesion are separated, and both may be integrated with each other to provide a single supporting body. For example according to the connecting structure 20B shown in FIG. 3, the optical waveguide part 1B includes the optical waveguide substrate 18, the supporting body 15 and the adhesive layer 4 adhering the supporting body 15 and optical waveguide substrate 18. In the supporting body 15, a protruding part 14B including an adhesive face 14a for providing a cured layer 12 of adhesive is provided in a single region distant from the optical waveguide substrate 18 in the direction T of the optical waveguide substrate 18. Further, it is formed the recess 7 defining the adhesive face between the adhesive face and the optical waveguide substrate.

In the case that the protruding part is provided on the side of the optical waveguide part, according to a preferred embodiment, the adhesive face of the protruding part and the end face of the optical waveguide are on the same plane (for example, refer to FIG. 2). Alternatively, according to a preferred embodiment, the adhesive face of the protruding part is protruded with respect to the end face of the optical waveguide. It is thereby possible to adjust the thickness of application of the adhesive depending on the viscosity and properties, and thus preferable.

For example, according to a connecting structure 20C shown in FIG. 4, in an optical waveguide substrate 1C, the separate body 6 for adhesion is joined to the bottom face of the supporting body 5, and the recess 7 is formed by the body for adhesion and supporting body. A protruding part 14C is formed in the body 6 for adhesion. Here, the adhesive face 14a of the protruding part 140 is protruded toward the holding part 2 with respect to the end face 3a of the optical waveguide.

By protruding the end face of the protruding part with respect to the end face of the optical waveguide, the thickness of the cured layer of the adhesive can be made smaller so that the influences of the applied cycles of thermal shock can be further reduced.

Figure 5:
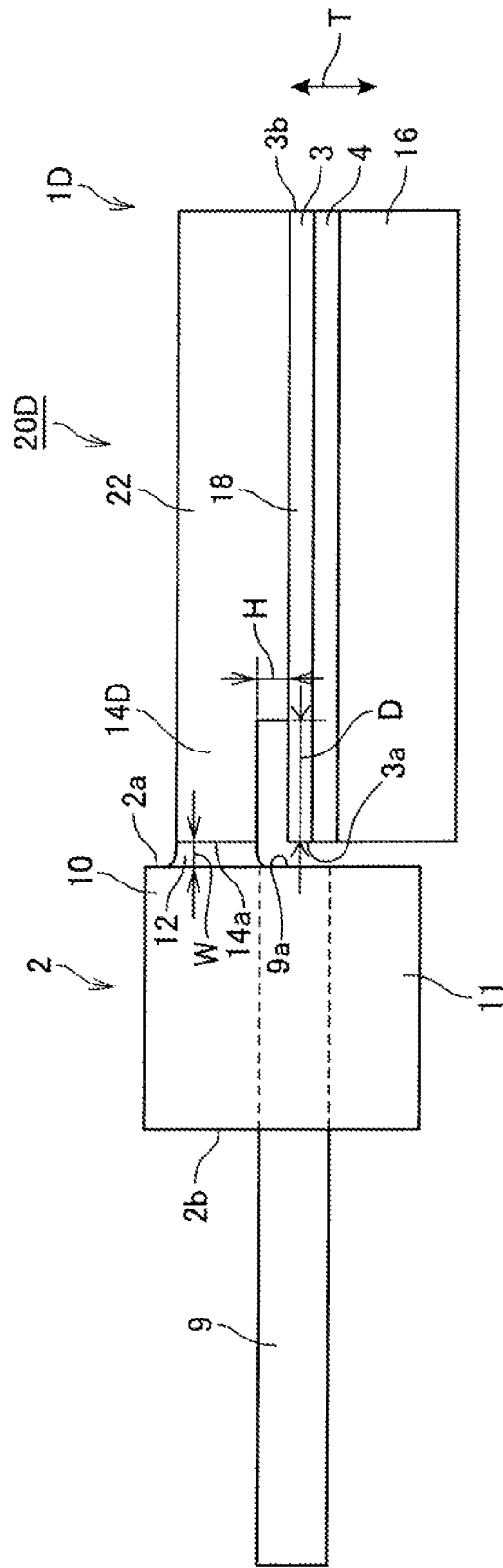
FIG. 5 is a view schematically showing a connecting structure 20D according to still another embodiment of the present invention.

Further, according to a preferred embodiment, an upper substrate is provided on the opposite side of the supporting body with respect to the optical waveguide substrate, and the protruding part is provided in the upper substrate. For example, according to a connecting structure 20D shown in FIG. 5, the optical waveguide substrate 3 is adhered to a supporting body 16 and the protruding part is not provided in the supporting body 16. On the other hand, an upper substrate 22 is provided on the upper side of the optical waveguide substrate, and a protruding part 14D for adhesion is formed in the upper substrate 22. The adhesive face 14a at the tip end of the protruding part 141) is adhered to the end face of the holding part 2 through the cured layer of adhesive.

During the step of curing the adhesive, vapor generated from the adhesive tends to move upwardly. Here, for example as exemplified in FIG. 5, by providing the adhesive in the position over the optical waveguide, it is possible to prevent the adhesion of the vapor generated from the adhesive onto the end face of the optical waveguide.

However, according to the embodiments as shown in FIGS. 1, 2, 3, 4, 6 and 10 showing the states that, after the curing, the adhesive part is depicted under the optical waveguide substrate, it is needless to say that the adhesive may be positioned over the optical waveguide substrate during the curing of the adhesive.

Further, the protruding part may be provided in the holding part. For example, according to a connecting structure 20E shown in FIG. 6, the optical waveguide part 1E includes the optical waveguide substrate 18, the supporting body 16, and the adhesive layer 4 adhering the supporting body 16 and optical waveguide substrate 18. It is not provided the protruding part including the adhesive face for adhering the cured layer of the adhesive in the optical waveguide substrate 16. Instead, in a main body 11A of a holding part 2A, a protruding part 14E is provided in a single region distant from the optical waveguide substrate 18 in the direction T of thickness of the optical waveguide substrate 18. It is further formed the recess 7 defining the adhesive face between the adhesive face and optical input member.

Figure 6:
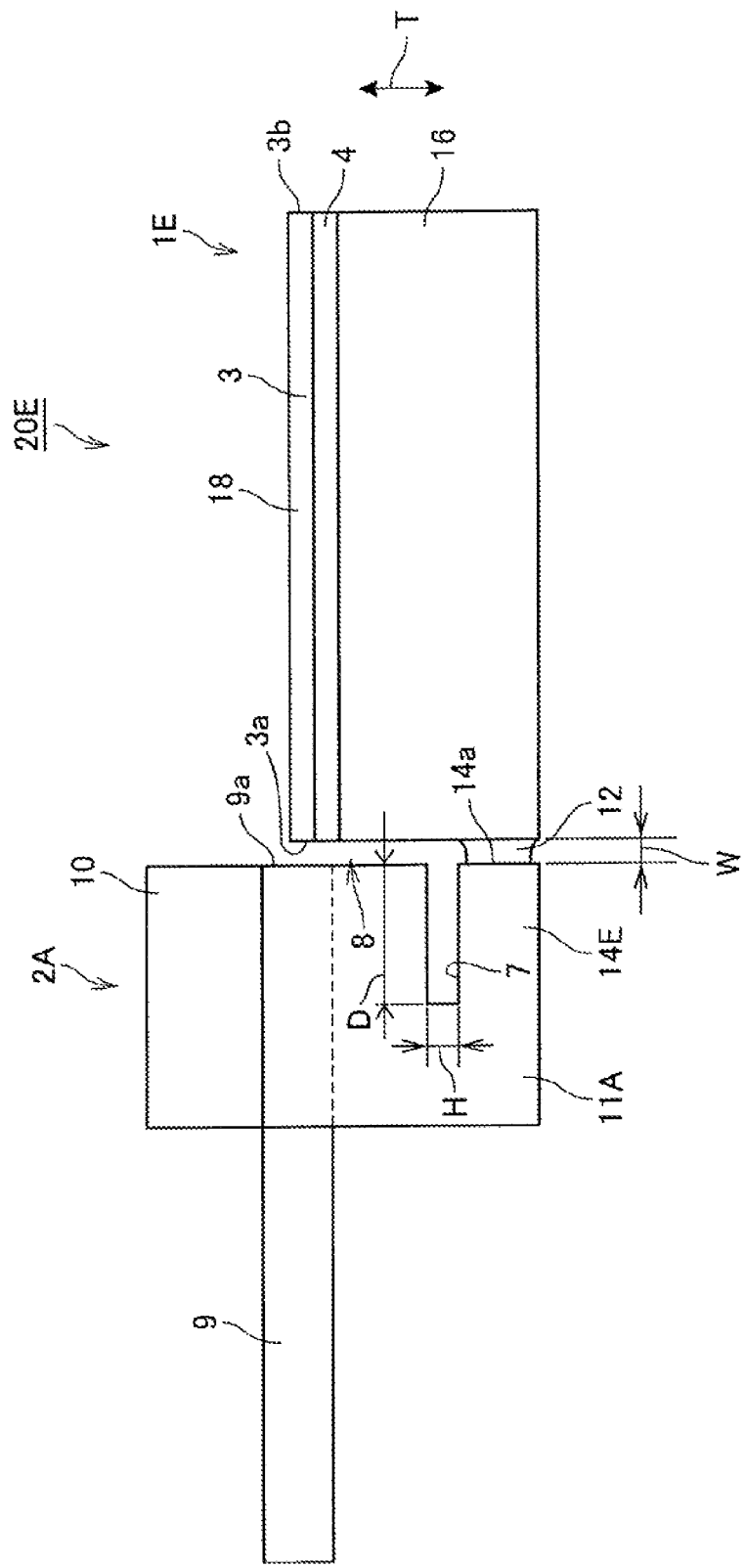
FIG. 6 is a view schematically showing a connecting structure 20E according to still another embodiment of the present invention.

According to the present embodiment, for example as shown in FIG. 6, the adhesive face 14a of the protruding part and the end face 9a of the optical input member 9 may be present on the same plane. Alternatively, the adhesive face of the protruding part may be protruded toward the optical waveguide part with respect to the end face of the optical input member, and these modifications are same as those in the case of the optical waveguide part.

Further, according to the present invention, the recesses as described above may be provided in both of the holding part of the optical input member and the optical waveguide part, the adhesive faces may be defined by the respective recesses, and the adhesive face of the holding part of the optical input member and the adhesive face of the optical waveguide part may be adhered to each other.

Figure 10:
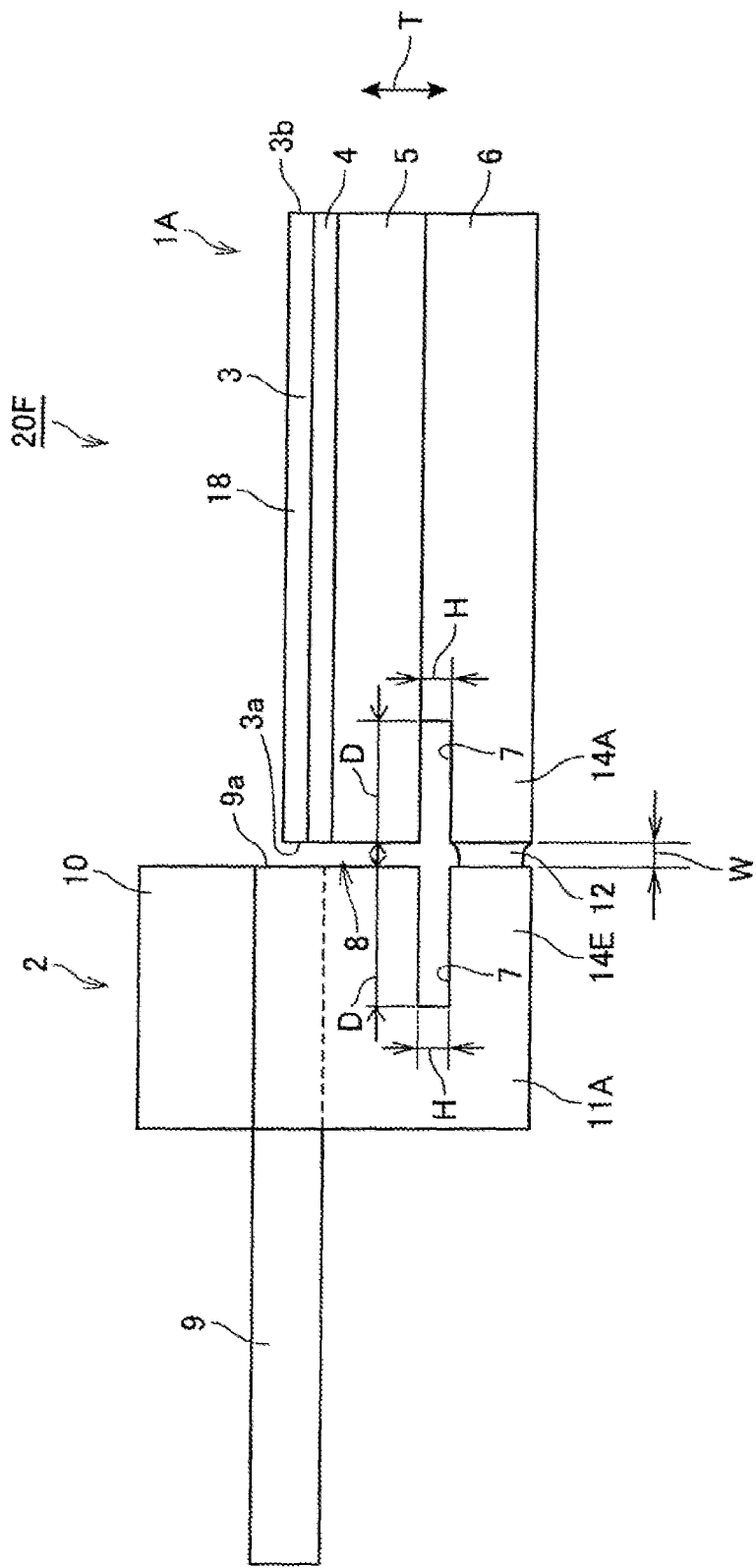
FIG. 10 shows an example providing recesses in both of the optical waveguide part and the holding part of the optical input member.

For example, according to a connecting structure 20F of FIG. 10, the holding part 2A and optical wave guide part 1 as described above are joined with each other.

That is, the optical waveguide part 1 includes an optical waveguide substrate 18, a supporting body 5 adhering the optical waveguide substrate 18 through the adhesive layer 4, and a body 6 for adhesion adhered to a lower face of the supporting body 5. The channel type optical waveguide 3 is formed in the optical waveguide substrate 18. A first end face 3b of the channel type optical waveguide 3 is exposed to the tip end and second end face 3a is exposed to a face opposing the holding part 2.

In the main body 11A of the holding part 2A, a protruding part 14E is provided in a single region distant from the optical waveguide substrate 18 in the direction T of the thickness of the optical waveguide substrate 18. It is further formed the recess 7 defining the adhesive face between the adhesive face and the optical input member.

A cured layer 12 of the adhesive is formed between the adhesive face in the side of the optical waveguide part and the adhesion face on the side of the holding part to adhere both of them. At this time, space is formed between the end face of the optical input member and end face of the optical waveguide and the adhesive is not provided in the space.

According to the examples as described above, it has been shown cases that the optical input member is an optical transmitting member. However, each of the optical transmitting members may be another type of an optical input member. For example, each of the inventive optical transmitting members of FIGS. 1 to 6 and 10 may be replaced with a light source. Each of FIGS. 11 and 12 shows only one example of such embodiments.

Figure 11:
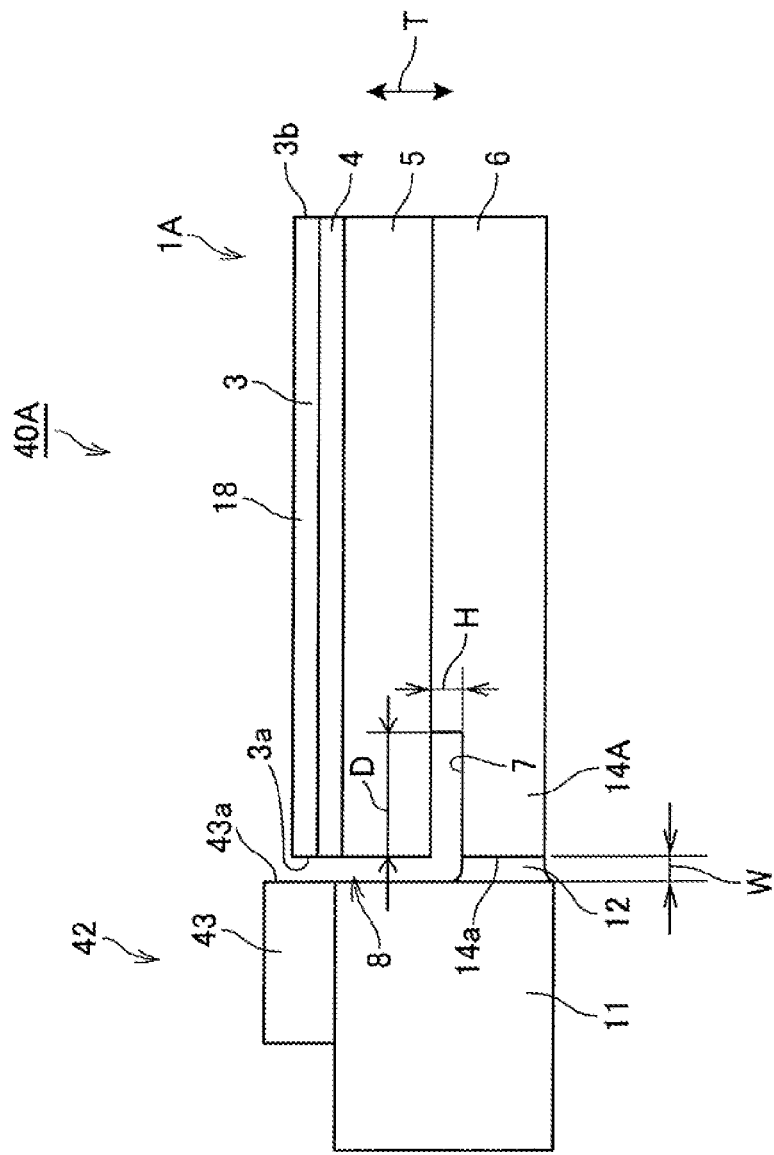
FIG. 11 is a view schematically showing a connecting structure of an optical waveguide part and a holding part of holding a light source.
Figure 12:
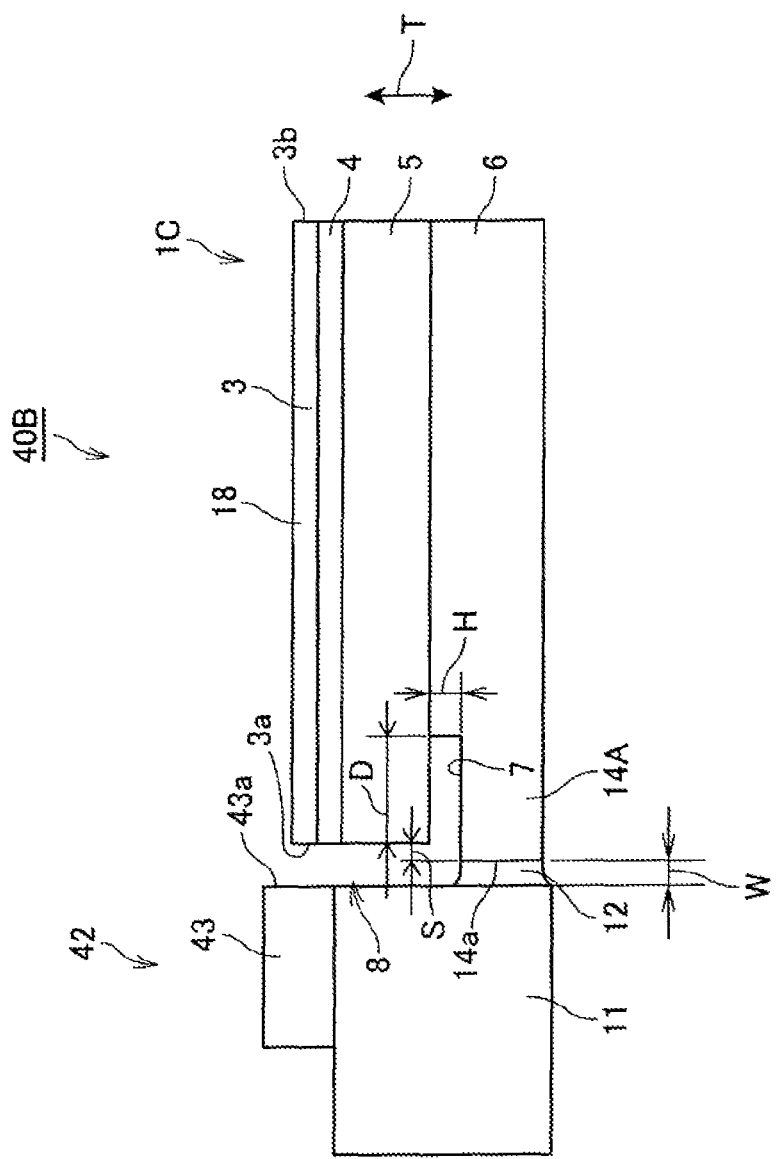
FIG. 12 is a view schematically showing another connecting structure of an optical waveguide part and a holding part of holding a light source.

For example, as shown in FIG. 11, the optical waveguide part 1A and holding part 42 are joined with each other through the cured layer 12 of the adhesive. According to the present example, the optical waveguide part 1A includes the optical waveguide substrate 18, the supporting body 5 adhering the optical waveguide substrate 18 through the adhesive layer 4, and the body 6 for adhesion joined to the lower face of the supporting body 5. The channel type optical waveguide 3 is formed in the optical waveguide substrate 18. The first end face 3b of the channel type optical waveguide 3 is exposed to the tip end, and the second end face 3a is exposed to the face opposing the holding part 2.

Further, a light source 43 is fixed and positioned at a predetermined position of the holding part 42. The holding part 42 includes the main body 11 and the light source 43 on the main body 11. The inside of the light source itself is well known and thus omitted.

A space 8 is provided between the end face of the optical waveguide part 1A and the end face of the holding part 2. Then, according to the example of FIG. 11, in the optical waveguide part 1, it is provided a protruding part 14A having an adhesive face 14a for adhering the cured layer 12 of the adhesive in a single region distant from the optical waveguide substrate 18 in the direction T of thickness of the optical waveguide substrate 18. It is further formed the recess 7 defining the adhesive face between the adhesive face and optical waveguide substrate.

The cured layer 12 of the adhesive is formed between the adhesive face 14a of the protruding part 14A and the end face of the main body 11 of the holding part 2 to adhere both of them. At this time, a space is provided between the end face 43a of the light source 43 and the end face 3a of the optical waveguide 3 and the adhesive is not provided in the space.

During the production of the connecting structure 40A, the adhesive is applied on the adhesive face 14a, the optical waveguide part and holding part are opposed to each other, and the light source and optical waveguide are aligned to each other. Then, the adhesive is contacted with the end face of the holding part and then cured. At this time, excessive adhesive is flown into the groove 7 so that the thickness of the adhesive is regulated.

Further, for example according to a connecting structure 4013 of FIG. 12, in a optical waveguide substrate 1C, the separate body 6 for adhesion is adhered to the bottom face of the supporting body 5, and the recess 7 is formed by the body for adhesion and supporting body. A protruding part 14C is formed in the body 6 for adhesion. Here, the adhesive face 14a of the protruding part 14C is protruded toward the holding part 2 with respect to the end face 3a of the optical waveguide.

By protruding the end face of the protruding part with respect to the end face of the optical waveguide, it is possible to reduce the thickness of the cured layer of the adhesive so that the influences by the applied cycles of thermal shock can be further reduced.

Figure 13:
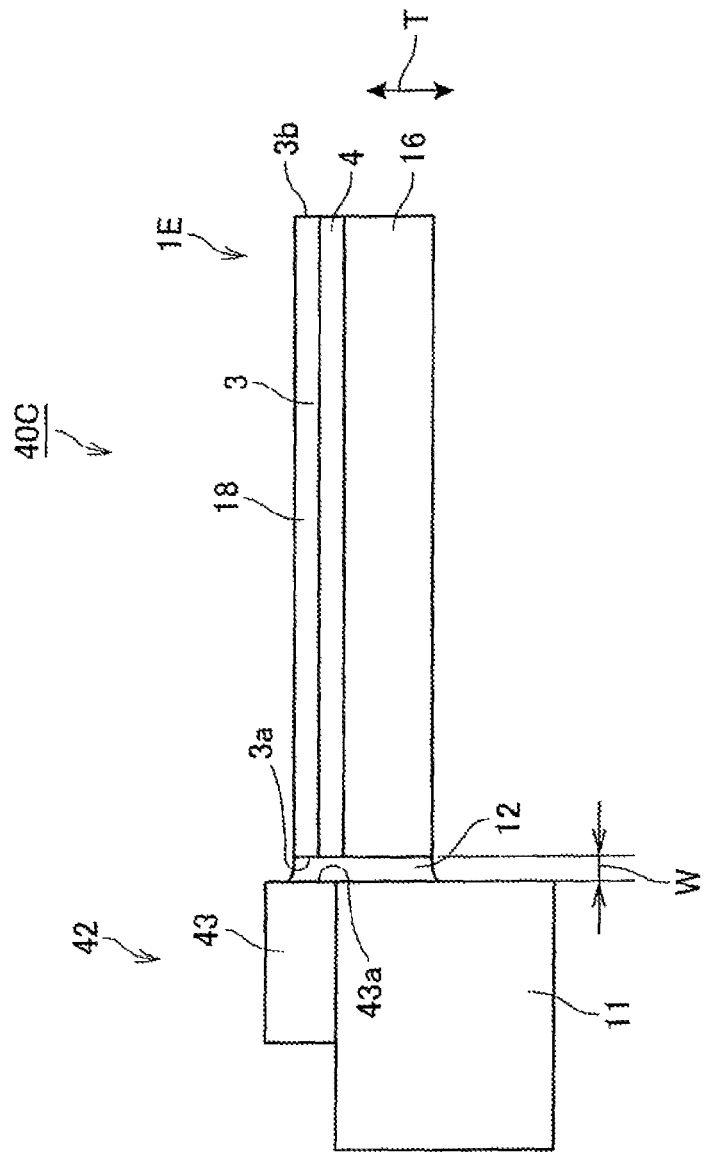
FIG. 13 is a view schematically showing a connecting structure of an optical waveguide part and a holding part of holding a light source, according to a comparative example.

FIG. 13 shows a connecting structure 40C according to a comparative example.

According to the example, it is used the optical waveguide part 1E shown in FIG. 6. The optical waveguide part 1E includes the optical waveguide substrate 18, the supporting body 16, and the adhesive layer adhering the supporting body 16 and optical waveguide substrate 18. It is not provided, in the optical waveguide substrate 16, the protruding part having the adhesive face to which the cured layer 12 of the adhesive is adhered.

Further, the light source 43 is fixed and positioned at a predetermined position of the holding part 42. The holding part 42 includes the main body 11 and light source 43 on the main body 11.

A space 8 is provided between the end face of the optical waveguide part 1E and the end face of the holding part 42. Then, it is formed the cured layer 12 of the adhesive between the end face of the optical waveguide part 1E and the end face of the holding part 42 so that they are adhered to each other.

According to each of the above examples, each cured layer of the adhesive is composed of an integral body and the integral cured layer of the adhesive is contacted with each adhesive face to constitute each adhesive part. However, at each of the adhesive parts, the integral cured layer of the adhesive may be divided into a plurality of cured layers of adhesive. Further in this case, the plurality of the cured layers of adhesive contact the single adhesive face defined by the recess.

Materials constituting the optical waveguide substrate are ferroelectric electro-optic materials and preferably of a single crystal. Although such crystal is not particularly limited as far as the modulation of light is possible, it may be listed lithium niobate, tantalum niobate, lithium niobate-lithium tantalate solid solution, potassium lithium niobate, KTP, GaAs and quartz.

Materials of the supporting body, holding part and body for adhesion may be a glass such as quartz glass, in addition to the ferroelectric and electro-optical materials described above.

As the adhesives of adhering the optical waveguide substrate and supporting body and of adhering the optical waveguide part and holding part, it may be listed epoxy resin adhesive, a thermosetting resin adhesive, an ultraviolet curable resin adhesive, and Alon Ceramics C °trade name, supplied by Toa gosei co. Ltd.) with a thermal expansion coefficient of $13 \times 10^{-6}$K).

For joining the optical waveguide part and holding part, it may be carried out by using an optical aligner which is movable at a precision of sub microns. That is, the optical waveguide part and holding part are fixed on a jig dedicated to an optical aligner, respectively. First, the optical axes of the optical waveguide of the optical waveguide part and the optical input member are aligned at positions where the optical power of light emitted from the optical wave guide takes the maximum value. Thereafter, the adhesive is applied on the adhesive face and then cured by ultraviolet light or heat.

Although the depth D of the groove 7 is not limited, on the viewpoint of reducing the adverse influences of the adhesive on the optical path, the depth may preferably be 40 μm or larger and more preferably be 100 μm or larger. Further, the depth D of the groove 7 may preferably be 2000 μm or smaller on the viewpoint of the mechanical strength.

Although the width H of the groove 7 is not limited, the width may preferably be 40 μm or larger and more preferably 100 μm or larger, on the viewpoint of reducing the adverse influences of the adhesive on the optical path. Further, the width H of the groove 7 may preferably be 500 μm or smaller on the viewpoint of the mechanical strength.

The width W between the adhesive face 14a and the part on the opposing side may preferably be 3 μm to 25 μm and more preferably be 5 μm to 10 μm, on the viewpoint of the adhesive strength.

Further, the height S of protrusion of the adhesive face 14a with respect to the end face of the part can be appropriately adjusted depending on the required size of the space. For example, S may be 10 μm to 500 μm.

EXAMPLES

The connecting structures of the respective examples were produced according to the following specifications and tested for the reliability.

Example A

Figure 3:
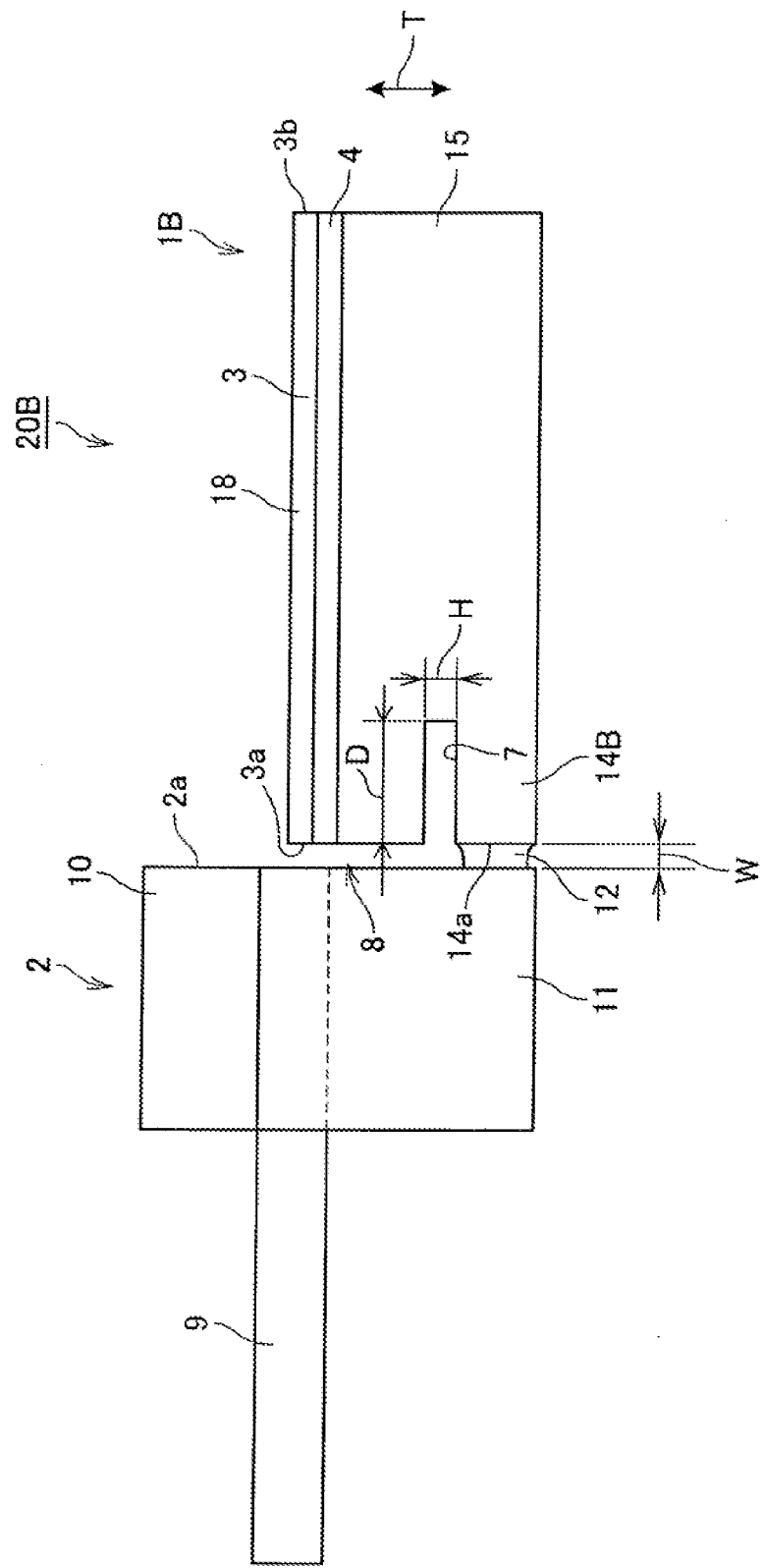
FIG. 3 is a view schematically showing a connecting structure 20B according to another embodiment of the present invention.
Figure 7:
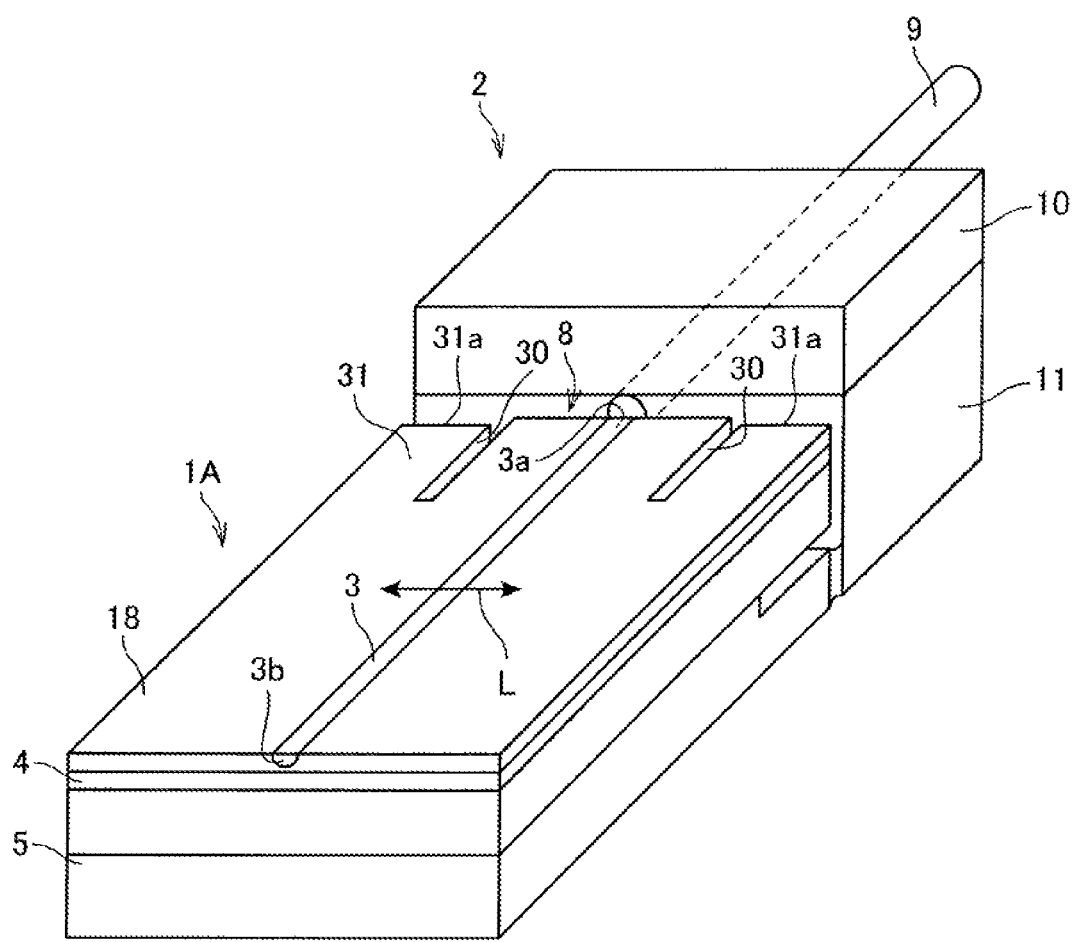
FIG. 7 is a perspective view schematically showing a connecting structure according to a comparative example.
Figure 8:
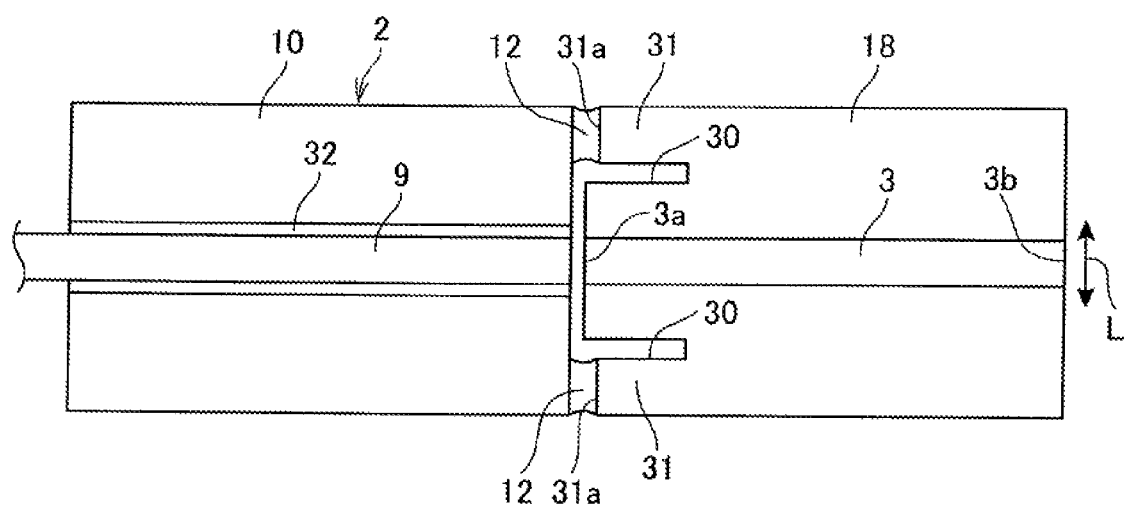
FIG. 8 is a plan view schematically showing the connecting structure of FIG. 7.

It was applied the structure shown in FIGS. 1 and 3.
Height H of groove 7; 0.2 mm Depth D of groove 7; 1.0 mm
Amount of protrusion of adhesive face; 0 μm
Distance between end faces of optical waveguide and optical fiber; 10 μm Example B It was applied the structure shown in FIGS. 1 and 3.
Height H of groove 7; 0.5 min
Depth D of groove 7; 0.3 mm
Amount of protrusion of adhesive face; 0 μm
Distance between end faces of optical waveguide and optical fiber; 10 μm Example C It was applied the structure shown in FIGS. 1 and 4.
Height H of groove 7; 0.2 mm
Depth D of groove 7; 1.0 mm
Amount S of protrusion of adhesive face; 10 μm
Distance between end faces of optical waveguide and optical fiber; 10 μm Example D It was applied the structure shown in FIGS. 1 and 4.
Height H of groove 7; 0.5 mm
Depth D of groove 7; 0.3 mm
Amount S of protrusion of adhesive face; 10 μm
Distance between end faces of optical waveguide and optical fiber; 10 μm Example E It was applied the structure shown in FIGS. 1 and 6.
Height H of groove 7; 0.2 mm
Depth D of groove 7; 1.0 mm
Amount S of protrusion of adhesive face; 0 μm
Distance between end faces of optical waveguide and optical fiber; 10 μm Example I It was applied the structure shown in FIG. 11.
Height H of groove 7; 0.2 mm
Depth D of groove 7; 1.0 mm
Amount S of protrusion of adhesive face; 0 μm
Distance between end faces of optical waveguide and semiconductor laser; 10 μm Example J It was applied the structure shown in FIG. 12.
Height H of groove 7; 0.2 mm
Depth D of groove 7; 1.0 mm
Amount S of protrusion of adhesive face; 10 μm
Distance between end faces of optical waveguide and semiconductor laser; 20 μm Comparative Example F It was applied the structure shown in FIGS. 7 and 8.
However, in the optical waveguide part, the grooves 30 were formed in the two regions distant from the optical waveguide in the direction of width of the optical waveguide substrate, and the protruding parts 31 were formed in the outside of the grooves, respectively, so that the tip end of each protruding part 31 was made the adhesive face 31a. 32 represents a V-groove.

The width of the groove was 0.2 mm, the depth of the groove was 1.0 mm, and the amount of protruding part of the adhesive face of the protruding part with respect to the end face of the optical waveguide part was 0 μm.

Comparative Example G

Figure 9:
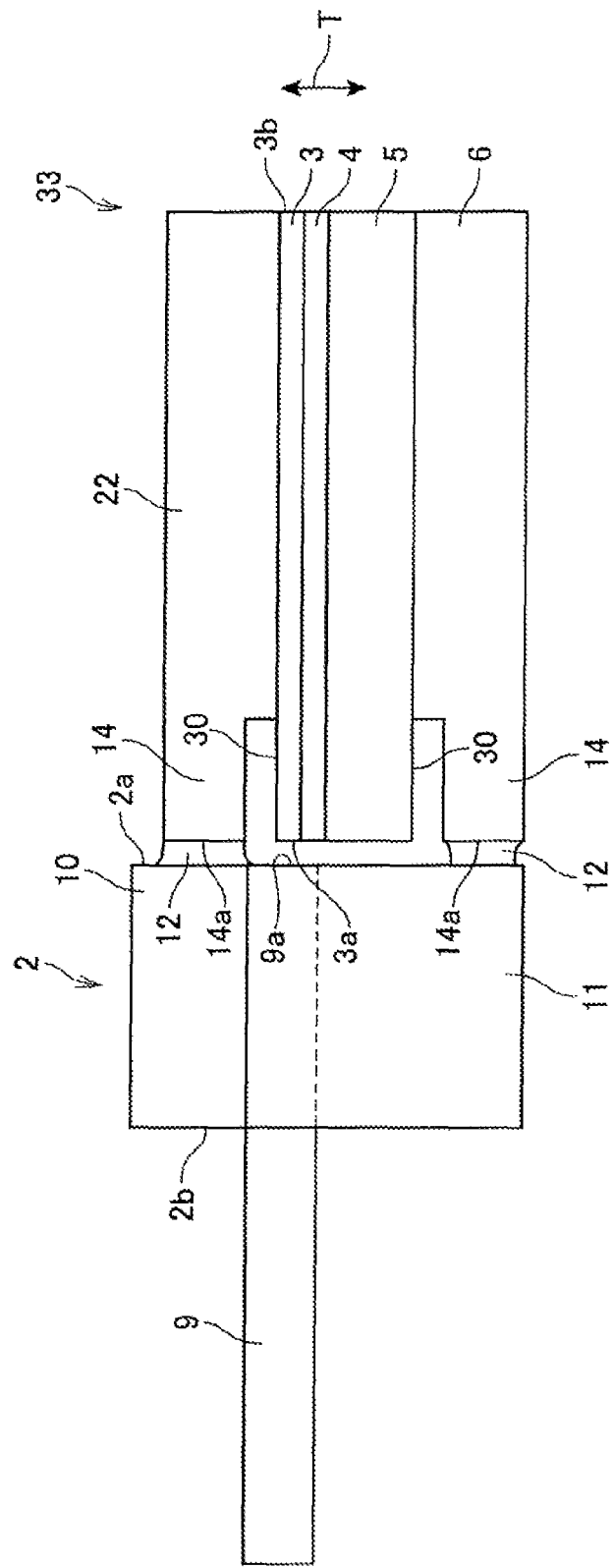
FIG. 9 is a view schematically showing a connecting structure of another comparative example.

It was produced the connecting structure having the construction shown in FIG. 9. However, in the optical waveguide part 33, two grooves 30 were formed in the two regions distant from the optical waveguide in the direction T of the optical waveguide substrate, and the protruding parts 14 were formed in the outside of the respective grooves 30 so that the tip end of each protruding part was made the adhesive face.

The width of the groove was 0.5 mm, the depth of the groove was 0.3 mm, and the amount of protrusion of the adhesive face of the protruding part with respect to the end face of the optical waveguide part was 0 μm.

Comparative Example H

It was produced the connecting structure similar to that of the comparative example F. However, the protruding part and grooves were formed in the optical fiber array. The width of the groove was 0.2 mm, the depth of the groove was 1.0 mm, and the amount of protrusion of the adhesive face of the protruding part with respect to the end face of the optical fiber was 0 μm.

Comparative Example K

It was produced the connecting structure having the construction shown in FIG. 13. It was used the optical waveguide substrate 1E having the construction shown in FIG. 13, and the end face of the optical waveguide and the end face of the semiconductor laser 43 were adhered to each other. The distance W of both was made 10 μm.

Besides, according to the inventive and comparative examples as described above, specifically, the material of the optical waveguide substrate was made an X-cut 3-inch wafer (MgO doped $LiNbO_3$ single crystal), and the optical waveguide was formed by titanium diffusion process and photolithography. Further, each of the substrates 5, 6, 22 and holding part were made of an X-cut 3-inch wafer ($LiNbO_3$ single crystal), "UV-1000" supplied by Daikin Industries, Ltd. was used as the adhesive, which was cured by ultraviolet light.

(Insertion Loss)

The following thermal cycle test was performed.

That is, it was applied thermal cycles between minus 40° C. and plus 85° C. for the examples A to H, and thermal cycles between plus 15° C. and plus 70° C. for the examples I, J and K, so that it was measured the insertion loss properties at the initial stage and after the application of the thermal shock cycles. As to the insertion loss, it was measured the ratio (insertion loss) of an output with respect to an input of the laser light in each of the connecting structures. The initial insertion loss was compared with those after the thermal shock cycles of 200 cycles and 500 cycles.

As to the examples A to E, I and J, after 200 cycles or 500 cycles of the thermal shock cycle test, the deviation with respect to the initial property was proved to be ±0.1 dB, which was at a level of measurement error. On the other hand, as to the comparative examples F to H and K, the following results were obtained.

F: Increase of 0.2 dB after 200 cycles
   Increase of 0.5 dB after 500 cycles
G: Increase of 0.3 dB after 200 cycles
   Increase of 1.1 dB after 500 cycles
H: Increase of 0.5 dB after 200 cycles
   Increase of 0.8 dB after 500 cycles
K: Increase of 9 dB after 200 cycles
   Increase of 10 dB after 500 cycles (Deviation of Light Amount)

While laser light was irradiated into each of the connecting structures of the examples A to H, the whole module was set in a thermostatic bath. The temperature in the thermostatic bath was changed from minus 40° C. to plus 85° C., and the deviation of the light amount of light emitted from the module was measured. The results were shown below.

While laser light was oscillated in each of the connecting structures of the examples I, J and K, the whole module was set on a Pertier device. The temperature of the module was changed from plus 15° C. to plus 70° C., and the deviation of the light amount of light emitted from the module was measured. The results were shown below.

Example A

After 200 cycles of thermal shock: The light amount was gradually changed by about 0.10 dB (elevation of light amount) during the temperature descending step and gradually changed in about 0.20 dB (decrease of light amount) during the temperature ascending step.

After 500 cycles: The light amount was gradually changed by about 0.05 dB (decrease of light amount) during temperature descending step).

Example B

After 200 cycles: The light amount was gradually changed by about 0.10 dB (decrease of light amount) during the temperature ascending step).

After 500 cycles: The light amount was gradually changed by about 0.05 dB (increase of light amount) during the temperature descending step and gradually changed by about 0.20 dB (decrease of light amount) during the temperature ascending step.

Example C

After 200 cycles: The light amount was gradually changed (decrease of light amount) by about 0.20 dB in the temperature descending step.

After 500 cycles: The result was same as the case after 200 cycles.

Example D

After 200 cycles: The light amount was gradually changed (increase of light amount) by about 0.10 dB in the temperature descending step.

After 500 cycles: The light amount was gradually changed (decrease of the light amount) by about 0.10 dB in the temperature ascending step.

Example E

After 200 cycles: The light amount was gradually changed (increase of light amount) by about 0.1 dB in the temperature ascending and descending steps.

After 500 cycles: The light amount was gradually changed (increase of light amount) by about 0.2 dB in the temperature descending step and gradually changed by about 0.1 dB (increase of light amount) in the temperature ascending step.

Example I

After 200 cycles: The light amount was gradually changed (increase of light amount) by about 0.1 dB in the temperature ascending and descending steps.

After 500 cycles: The light amount was gradually changed (increase of light amount) by about 0.2 dB in the temperature descending step and gradually changed (increase of light amount) by about 0.1 dB in the temperature ascending step.

Example J

After 200 cycles: The light amount was gradually changed (increase of light amount) by about 0.1 dB in the temperature ascending and descending steps.

After 500 cycles: The light amount was gradually changed (increase of light amount) by about 0.2 dB in the temperature descending step and gradually changed (increase of light amount) by about 0.1 dB in the temperature ascending step.

Comparative Example F

After 200 cycles: The light amount was rapidly changed by about 0.8 dB in the temperature descending step and gradually changed by 0.1 dB in the temperature ascending step.

After 500 cycles: The light amount was rapidly changed by about 0.8 dB in the temperature descending step.

Comparative Example G

After 200 cycles: The light amount was decreased by about 0.6 dB in the temperature descending step and gradually increased by about 0.2 dB in the temperature ascending step.

After 500 cycles: The light amount was instantaneously changed by about 2.0 dB in the temperature ascending and descending steps in the high temperature range.

Comparative Example H

After 200 cycles: The light amount was rapidly decreased by about 1.7 dB in the temperature descending step, and rapidly increased by about 0.95 dB in the temperature ascending step.

After 500 cycles: The light amount was rapidly decreased by about 2.0 dB in the temperature descending step, and rapidly increased by about 0.93 dB in the temperature ascending step.

Comparative Example K

After 200 cycles: The insertion loss was too large to measure. After 500 cycles: The insertion loss was too large to measure.

According to the examples A to E, I and J, the deviation of the light amount during the temperature ascending and descending steps was small to provide values suitable for practical use. According to the comparative examples F to H and K, the value of deviation of light amount was large and the slope of the deviation of the light amount was large, so that it was not provided the values suitable for general optical parts. As to the problem that the light amount was increased according to the comparative examples F to H, the adhesive layers are provided on the two adhesive faces. As a result, the shrinkage during the curing step of adhesive layer is not uniform on the two adhesive faces and the adhesion was made so that the optical axes are not aligned with each other. Further, as to the cause that the deviation of the light amount is large during the thermal cycle test according to the comparative examples, the shift of the optical axes after the curing of the adhesive is large as described above, so that the deviation of the light amount is sensitive with respect to the shift of the optical axes.

As to the problem that the insertion loss becomes large according to the comparative example K, it is considered that the adhesive is flown into the optical path and the adhesive is thus heated by the laser light and deteriorated.

The invention claimed is:

1. A connecting structure comprising an optical waveguide part, and a holding part of holding an optical input member;
   wherein said optical waveguide part comprises an optical waveguide substrate comprising an optical waveguide;
   wherein at least one of said holding part and said optical waveguide part comprises a recess and an adhesive face adjacent to said recess;
   wherein an adhering part, which adheres said optical waveguide part and said holding part is provided on said adhesive face and in a single region distant from said optical waveguide substrate in a direction of thickness of said optical waveguide substrate;
   wherein said recess is provided between said adhering part and said optical waveguide substrate; and
   wherein a space is provided between an end face of said optical input member and an end face of said optical waveguide.

2. The connecting structure of claim 1, wherein said optical input member comprises an optical transmitting member or a light source.

3. The connecting structure of claim 1, wherein said recess is provided in said optical waveguide part.

4. The connecting structure of claim 3, wherein said adhesive face is protruded toward said holding part with respect to said end face of said optical waveguide.

5. The connecting structure of claim 3, wherein said optical waveguide part comprises a supporting body supporting said optical waveguide substrate.

6. The connecting, structure of claim 5, wherein said recess is provided in said supporting body.

7. The connecting structure of claim 5, further comprising a separate body for adhesion adhered to said supporting body, wherein said recess is provided in said body for adhesion.

8. The connecting structure of claim 5, further comprising an upper body opposing to said supporting body with respect to said optical waveguide substrate, and wherein said recess is provided in said upper body.

9. The connecting structure of claim 1, wherein said recess and said adhesive face are provided in said holding part.

10. The connecting structure of claim 9, wherein said adhesive face is protruded toward said optical waveguide part with respect to said end face of said optical input member.

11. A method of manufacturing the connecting structure of claim 1, said method comprising the steps of:
    providing an adhesive on said adhesive face provided in at least one of said holding part and said optical waveguide part, while said optical waveguide substrate is positioned under said adhesive; and
    curing said adhesive to form said adhesive part.

* * * * *